United States Patent [19] [11] Patent Number: 5,524,803
Arvidsson [45] Date of Patent: Jun. 11, 1996

[54] LOAD CARRIER

[75] Inventor: Jan-Ivar Arvidsson, Hillerstorp, Sweden

[73] Assignee: Industri AB Thule, Hillerstorp, Sweden

[21] Appl. No.: 310,094

[22] Filed: Sep. 22, 1994

Related U.S. Application Data

[63] Continuation of Ser. No. 859,688, filed as PCT/SE90/00778, Nov. 26, 1990, published as WO91/08929, Jun. 27, 1991, abandoned.

[30] Foreign Application Priority Data

Dec. 11, 1989 [SE] Sweden .................................. 8904163

[51] Int. Cl.$^6$ ........................................................ B60R 9/04
[52] U.S. Cl. ............................ 224/321; 224/326; 410/150
[58] Field of Search ................................ 224/282, 42.01, 224/42.08, 309, 310, 314, 315, 320, 321, 324, 325, 326, 330; 292/210, 209, 194; 403/83, 85, 65, 95; 410/143, 144, 148–150; 296/3

[56] References Cited

U.S. PATENT DOCUMENTS

| | | | |
|---|---|---|---|
| 3,433,179 | 3/1969 | Sharp | 410/149 |
| 3,774,939 | 11/1973 | Freads et al. | 410/149 |
| 4,702,653 | 10/1987 | Gaulding et al. | 410/150 |
| 5,069,377 | 12/1991 | Baughman | 224/326 |
| 5,071,050 | 12/1991 | Pudney et al. | 224/321 |

FOREIGN PATENT DOCUMENTS

| | | |
|---|---|---|
| 2946533 | 5/1981 | Germany . |
| 3102736 | 9/1982 | Germany . |
| 3641745 | 6/1988 | Germany . |
| 3814799 | 11/1988 | Germany . |

*Primary Examiner*—Renee S. Luebke
*Attorney, Agent, or Firm*—Druce Novak; Burt Herrmann

[57] ABSTRACT

A load carrier for vehicles has two longitudinal load supports adapted to be fixed to a roof of a vehicle and transverse load supports which are movably disposed between the longitudinal supports. One end of a transverse load support is pivotally connected to a movable joint provided in each of the longitudinal load supports and a movable locking member is provided in the opposing longitudinal support. The transverse load supports may be folded into the longitudinal load supports when not in use, and pivoted to a load carrying position extending between longitudinal supports and secured by the locking member. The load carrying position of the transverse load supports along the longitudinal supports may be changed by moving the joint and locking members.

16 Claims, 3 Drawing Sheets

LOAD CARRIER

This application is a continuation of application Ser. No. 07/859,688, filed Jun. 11, 1992 and now abandoned.

FIELD OF THE INVENTION

The present invention relates to a load carrier which is intended for vehicular use and which comprises two longitudinal load supports, so-called rails, permanently fixed on the vehicle roof and between which transverse load supports may be disposed.

BACKGROUND AND SUMMARY OF THE INVENTION

Load carriers of the above-mentioned type are becoming progressively mere common, in particular on estate cars, station wagons and the like. Such load carriers afford advantages in that they are permanently mounted on the vehicle roof, whereby those problems which are associated with mounting of special load struts with support feet to the side edge areas of the vehicle roof will be avoided.

However, load carriers of this type also suffer from disadvantages in that they are exclusively longitudinal. Hereby, for employing conventional roof load carrying equipment such as ski boxes, bicycle racks, ski racks, load baskets and the like, use must as a rule be made of separate, transverse load supports which are secured to the longitudinal load supports or rails in some manner. Since the appearance of prior art load carriers of the type under consideration here has varied considerably from car model to car model, it is difficult to provide a universally applicable accessory system, since at least the transverse load supports must be specifically adapted to suit the car model in question and the longitudinal load supports mounted thereon.

Further disadvantages reside in the fact that the detachable transverse load supports require the same type of handling as conventional load struts, for which reason they are often not on hand when a load is to be carried on the roof.

The object of the present invention is to design a load carrier of the type disclosed by way of introduction in such a manner that the above-considered drawbacks are obviated. In particular, the present invention has for its object to devise a load carrier which in itself includes the transverse load supports. The present invention further has for its object to devise a load carrier which is aesthetically attractive and which permits large load capacity, simple switching to the load carrying position and no risk that detachable details may get lost. Finally, the present invention further has for its object to devise a load carrier which permits use of conventional roof load carrying equipment without specific modification thereof.

The objects forming the basis of the present invention will be attained if the load carrier intimated by way of introduction is characterised in that the transverse load supports are, with their one end, movably connected to one of the longitudinal load supports; and that they are switchable between inoperative positions folded in along or inside the longitudinal load supports, and operative positions where they extend between the longitudinal load supports.

By arranging, in this manner, the transverse load supports connected to the longitudinal load supports and outwardly pivotal therefrom, major aesthetic advantages will be gained, and the considerable practical advantage that separate storage of detachable parts no longer need be necessary.

According to the present invention, the load carrier is also suitably characterised in that the longitudinal load supports are provided with profiled portions with approximately C-shaped cross section which have their openings turned to face one another; and that the transverse load supports are accommodated in the profiled portions in their inoperative positions.

As a result of these features, advantages will be afforded in that the transverse load supports may be pivoted in and, for the greater part, concealed in the longitudinal load supports so that thereby air resistance is reduced, the risk of wind noise or whine is also reduced and aesthetic advantages are gained.

The load carrier according to the present invention is also suitably characterised in that the transverse load supports are pivotally connected, about substantially vertical axes, to the longitudinal load supports; that the pivotal connection between the longitudinal and the transverse load supports is designed so as to permit a certain displacement of the transverse load supports in their longitudinal direction in relation to that longitudinal load support to which each is connected; and that the free end of the transverse load support and the opposing longitudinal load support are provided with means for positionally fixing the free end.

As a result of these features, advantages will be gained primarily in that tolerances in the vehicle body and in the mounting positions for the longitudinal load supports may readily be compensated for. Furthermore, it is not necessary to place the longitudinal load supports exactly parallel to one another, which may be an advantage on certain vehicle body types.

Further advantages will be attained according to the present invention if the load carrier is also given any one or more of the characterising features as described below.

BRIEF DESCRIPTION OF THE ACCOMPANYING DRAWINGS

The nature of the present invention and its aspects will be more readily understood from the following brief description of the accompanying Drawings, and discussion relating thereto.

DESCRIPTION OF PREFERRED EMBODIMENT

Figure 1:
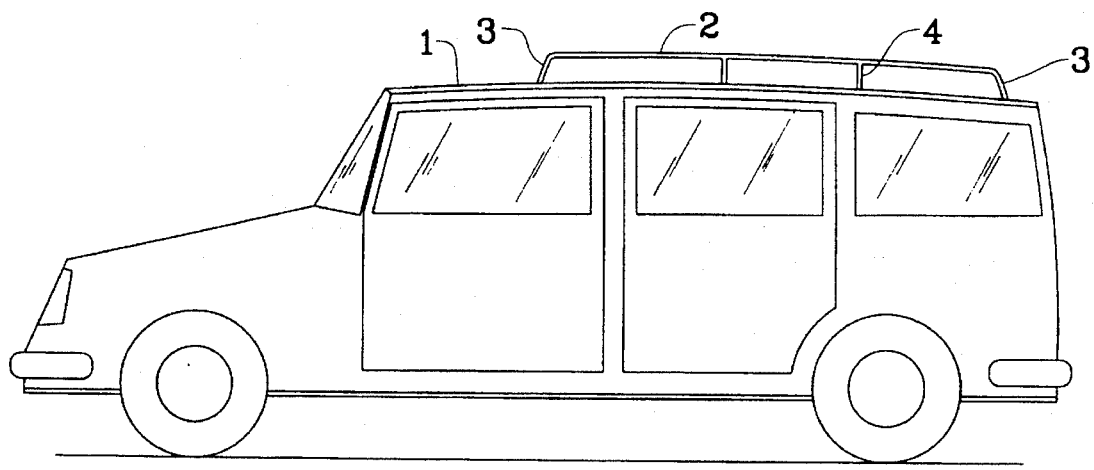
FIG. 1 is a side elevation of an estate car fitted with a load carrier according to the present invention.

Reference numeral 1 in FIG. 1 relates to a vehicle roof which ideally is the roof of an estate car. On this roof, there are permanently mounted two longitudinal load supports 2 approximately parallel to one another which, at their forward and rear ends, are provided with feet 3 by means of which they are secured in the roof. The longitudinal load supports 2 may further be provided with one or more intermediate feet 4.

Figure 2:
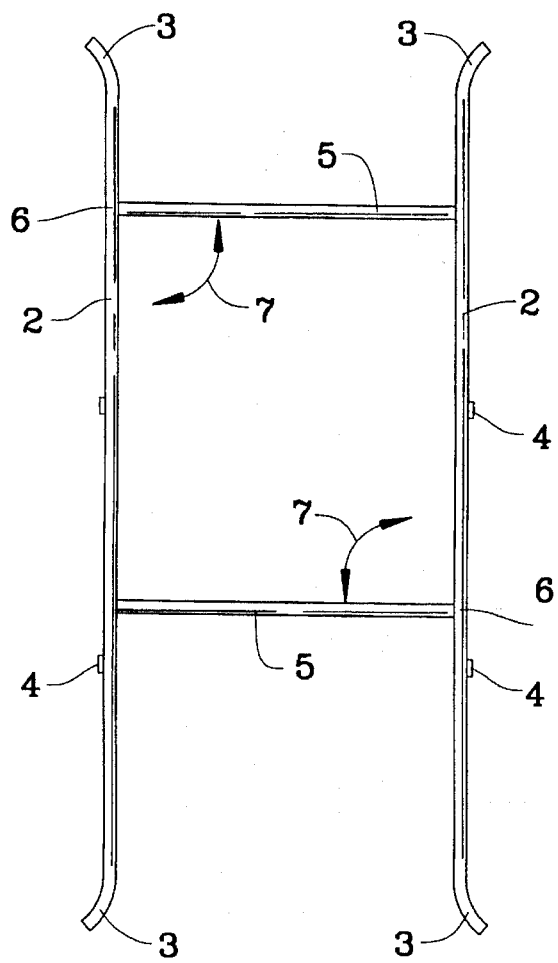
FIG. 2 is a top plan view of the load carrier of FIG. 1.

FIG. 2 is a top plan view of the load carrier of FIG. 1, and it will be apparent from this Figure that both of the longitudinal load supports 2 are, in this embodiment, placed parallel with one another. However, depending upon the design of the roof 1, the longitudinal load supports 2 may also be placed with different distances therebetween at their forward and rear ends.

At suitable positions along the longitudinal load supports, there are provided transverse load supports 5 which, with their one end, are pivotally connected by the intermediary of joints 6 to the longitudinal load supports 2 as shown by the arrows 7. In this instance, the transverse load supports 5 have free ends which are securable in the opposing longitudinal load support.

It will further be apparent from FIG. 2 that the transverse load supports 5 are interconnected each with one of the longitudinal load supports so that, thereby, the transverse load supports are pivotal in opposing directions past one another. Naturally, they may also be secured in the same longitudinal load support.

Figure 3:
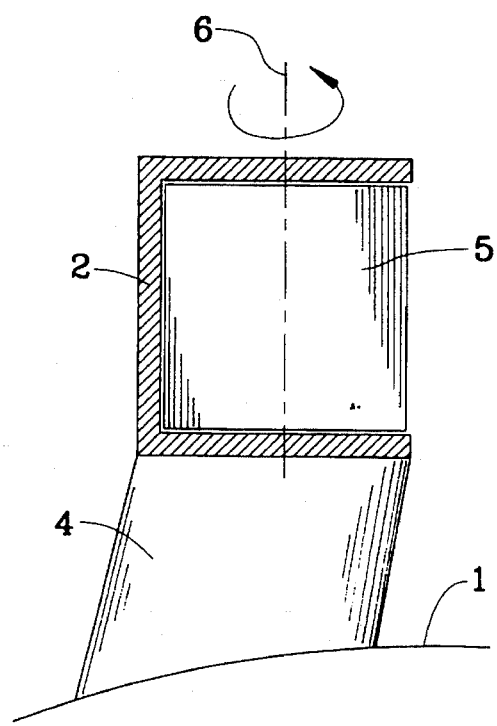
FIG. 3 is a vertical section, transversely in relation to the vehicle, through the one longitudinal load support according to FIG. 1.

FIG. 3 shows a substantially vertical section, transversely of the longitudinal direction of the vehicle, through one longitudinal load support 2, and the Figure also shows one of the intermediate feet 4 thereof which secure the load support to the vehicle roof 1. The broken line 6 illustrates the joint axis in that direction with which the transverse load support 5 is pivotal between an inoperative position folded in to the longitudinal load support 2 and an operative, load carrying position where it extends between the longitudinal load supports as shown in FIG. 2.

In order that pivoting of the transverse load supports 5 can take place as illustrated in FIG. 2 between the outwardly pivoted operative positions and the folded-in positions along or interiorly within the longitudinal load supports 2, it is merely necessary according to the present invention that the distance between the joint axes 6 in the longitudinal direction of the vehicle is slightly larger than the length of the transverse load support 5. Hence, according to the invention, the transverse load supports 5 may hereby be placed in the longitudinal direction in any optional position along both of the longitudinal load supports.

It will be apparent from the above disclosure that the free ends 9 on the transverse and pivotal load supports 5 must be able to pass one another on pivoting in accordance with the arrows 7. This is achieved according to the invention in that those joints 6 by means of which the transverse load supports 5 are secured in the longitudinal load supports are designed so as to permit a certain vertical displacement of the free ends, such that, hereby, these can be pivoted past one another by following pivotal paths which are located at different vertical positions.

In FIG. 3, the longitudinal load support 2 has been illustrated as having a square-edged, generally complementary shaped cross section having an opening in a sidewall thereof. This cross section may occur throughout the entire length of the longitudinal load support, but may also occur only along that part of the longitudinal load support in which the transverse load support is to be accommodated on inward pivoting thereof to its inoperative position. Hereby, the longitudinal load support has at least certain profiled portions with laterally open cross section which may wholly or partly accommodate the transverse load supports 5. Remaining portions of the longitudinal load support may have closed cross section whereby mechanical strength properties are improved.

Figure 4:
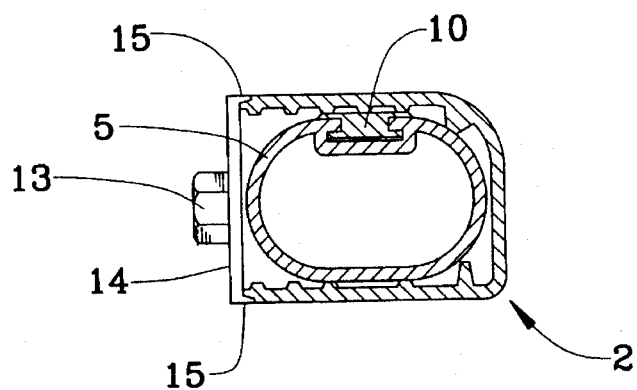
FIG. 4 shows a section corresponding to FIG. 3 through one practical embodiment of both the longitudinal load support and the transverse load support.

FIG. 4 shows one example of a slightly modified cross sectional configuration for the longitudinal load support 2. It will be apparent from this Figure that the cross section is, in principle, the same as in FIG. 3, apart from the fact that the corner regions are rounded-off so that the cross sectional configuration having an opening in the sidewall which may be approximately C-shaped. Furthermore, there are provided, interiorly in the profile of the longitudinal load support, vertically directed rigidifying ribs which increase mechanical strength in the vertical direction.

It will further be apparent from FIG. 4 that the transverse load support 5 has a generally oval cross section and that it has, in its upper face, an undercut groove with a longitudinal plastic strip 10 which is intended to prevent squeak and scratching of the transverse load support, or alternatively a load carried thereon.

Figure 5:
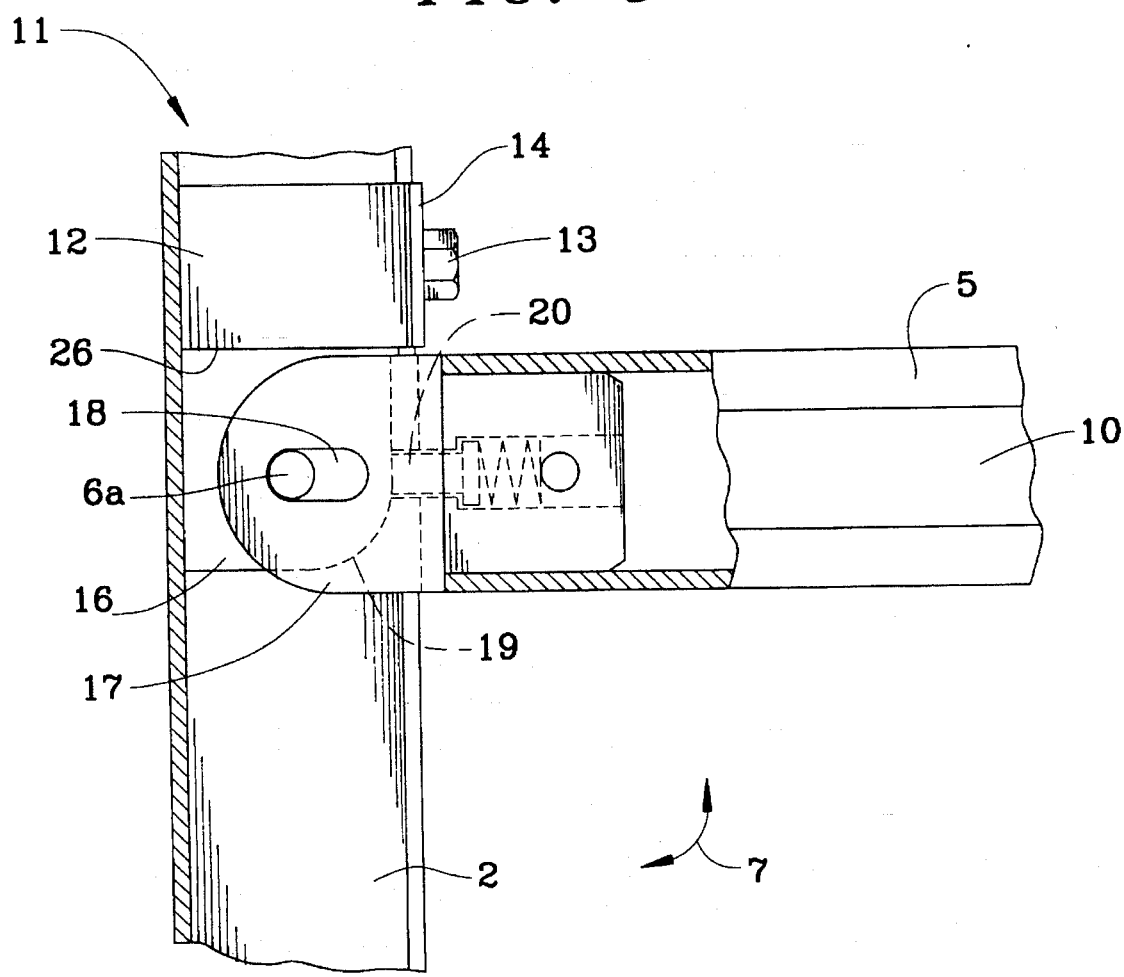
FIG. 5 shows a connection region for pivotal connection between one longitudinal load support and one transverse load support.

FIG. 5 shows how a pivotal connection can be realised between a longitudinal load support 2 and a transverse load support 5 with the design illustrated in FIG. 4. It will be apparent from this Figure that, interiorly within the longitudinal load support 2, there is provided a joint member 11 whose first portion, designated 12, is designed with its outer configuration to be complementary to the inner configuration of the longitudinal load support 2. Hereby, the first portion 12 of the joint member 11 may, with tight fit, be shifted interiorly in the longitudinal direction of the longitudinal load support. For positionally fixing the joint member 11 in the longitudinal load support, use is made of a screw 13 which engages with the first portion of the joint member 11. The screw extends through a locking washer 14 which, at its upper and lower edges as shown in FIG. 4, is provided with portions 15 which grasp about the outside of the free shanks on the longitudinal load support 2. By tightening of the screw 13, the locking washer is urged against the longitudinal load support at the same time as the joint member 11 strives to displace itself laterally and, by friction with the rigidifying ribs interiorly in the load support, is positionally fixed therein.

In FIG. 5, the joint member 11 has an anchorage portion 16 on whose both sides extend anchorage lugs 17 which protrude out from the end of the transverse load support 5 in order thereby to grasp about both sides of the anchorage portion 16. A pivot pin, or stub shaft 6a, extends through both the anchorage lugs 17 and the anchorage portion 16 and may run in oblong holes 18 in both of the anchorage lugs 17. Hereby, a certain displacement (within the longitudinal extent of the oblong hole) may be effected of the transverse load support 5 in its longitudinal direction in relation to the longitudinal load support.

In order to permit the above-mentioned possibility of pivoting in different vertical planes of the transverse load supports 5, i.e. such that the free end of the transverse load support 5 in FIG. 2 moves at right angles to the plane of the Drawing, the thickness of the anchorage portion 16 is suitably less than the distance in between the two anchorage lugs 17. This dimensioning, in combination with the oblong holes 18, provides such pivotal possibility.

It will further be apparent from the Drawing that the anchorage portion 16 has a curve 19 against which a spring-biased pin 20 abuts, whereby the transverse load support 5 strives to be displaced to the right in FIG. 5, i.e. away from the stub shaft 6a.

Figure 6:
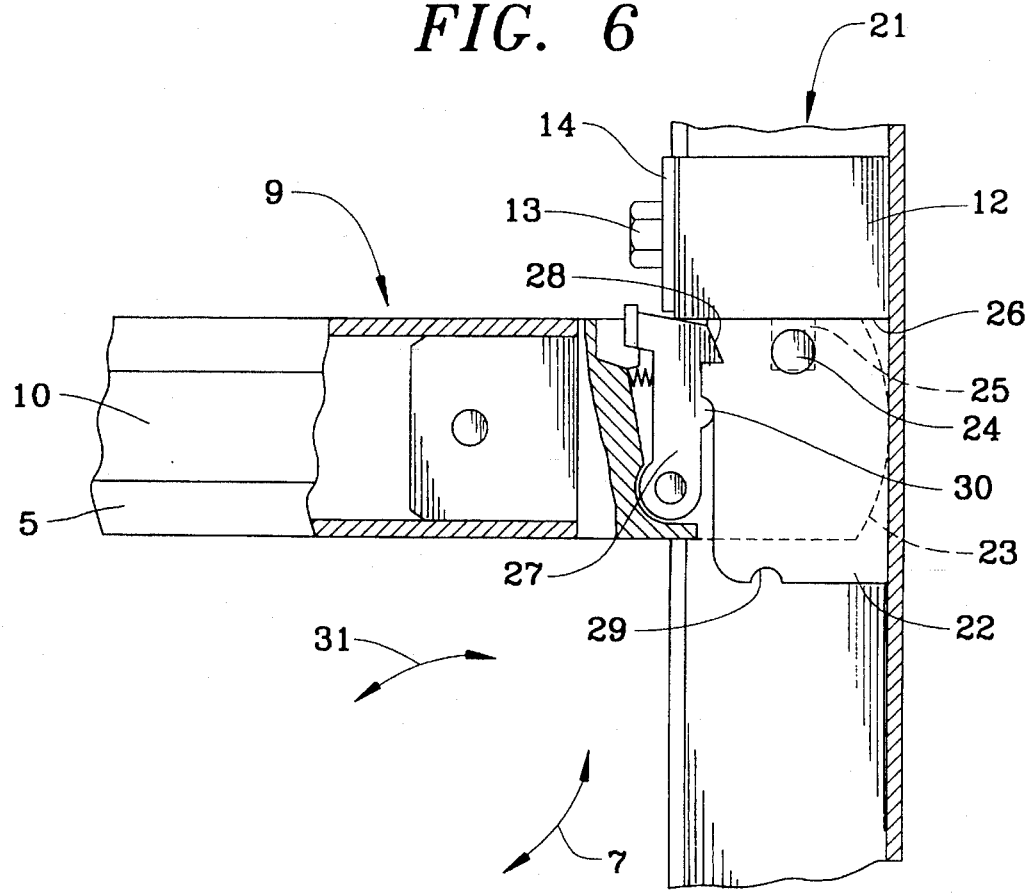
FIG. 6 shows a locking region for fixedly locking the free end of a transverse load support in a longitudinal load support.

FIG. 6 shows how the free end 9 of the transverse load support 5 may be brought into securement in the opposing longitudinal load support 2. For this purpose, the longitudinal load support is provided with a locking portion 21 located interiorly in the longitudinal load support, this locking portion, like the joint member 11, having an upper portion 12 by means of which the locking portion is securable at any optional length position along the longitudinal load support. This feature is realised in a corresponding manner by means of a screw 13 and a locking washer 14.

The locking portion 21 is provided, in FIG. 6, with a locking member 22 which is designed similar to the anchorage portion 16. On both sides of this locking member 22, the pivotal load support 5 is provided with lock lugs 23 which are intimated by broken lines in the Figure. At an first portion in FIG. 6 of the locking member 22, there is disposed a crosspin 24 which, in the illustrated position, is accommodated in recesses 25 in the two lock lugs 23. The pin 24 and the recesses 25 are placed in such a manner that, when the pin is accommodated in the recesses, the ends of the lock lugs 23 will substantially abut against the inside of the longitudinal load support. By cooperation between the ends of the lock lugs 23 and the load support proper and by cooperation between the pin 24 and the recesses 25, the pivotal load support 5 is positionally fixed in its longitudinal direction.

In order, in the operative load carrying position, to positionally fix the transverse load support 5 against forward displacement in the direction of travel of the vehicle—and also in such situations when extreme forces act on the support, for example in the event of emergency braking or a near-accident, both of the upper portions 12 on the joint member 11 and the locking portion 21, respectively, are provided with abutment surfaces 26 against which the leading vertical edges of the anchorage lugs 17 and the lock lugs 23, respectively, may abut.

For fixedly locking the pivotal load support 5 in the position illustrated in FIG. 6, use is made of a spring-biased pawl 27 which snaps into a recess 28 in the side edge of the locking member 22 facing in towards the center line of the vehicle.

FIG. 6 further illustrates that the locking member 22 is provided, in its downwardly facing edge on the Drawing (the rear edge on the vehicle), with a recess 29 which serves to accommodate a projection 30 on the pawl 27 on the pivotal load support which is secured in the same longitudinal load support 2 as the pertinent locking portion 21 when the pivotal load support is pivoted in to the longitudinal load support as intimated by the arrow 31. In such instance, the inoperative positioned pivoted load support will be reliably retained in position because of the spring pretensioning which is generated away from the stub shaft 6 (see FIG. 5).

DESCRIPTION OF ALTERNATIVE EMBODIMENTS

Figure 7:
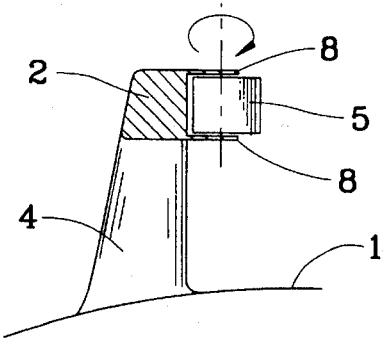
FIG. 7 shows a modified embodiment of the present invention in a view corresponding to that of FIG. 3.

FIG. 7 is a section corresponding to FIG. 3. It will be apparent from this Figure that the longitudinal load support 2 is provided with a portion with a closed, possibly solid, cross section from which shanks 8 laterally extend in towards the center line of the vehicle and accommodate between themselves the pivotal load support 5 when this is pivoted in to an inoperative position. The broken line 6 also intimates in this Figure the pivotal axis for securing the pivotal load support 5 in the longitudinal load support 2.

Figure 8:
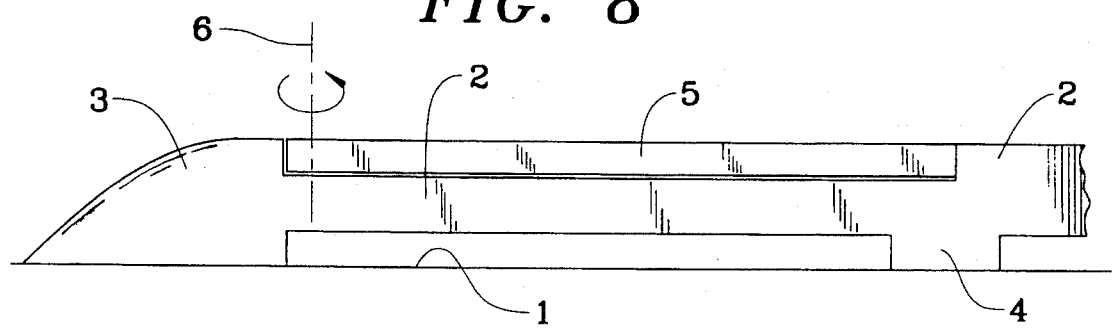
FIG. 8 shows yet a further modified embodiment of the present invention, seen from the side.

FIG. 8 shows a variant in which the pivotal load support 5 is placed on the upper side of the longitudinal load support 2 and in an upwardly open recess therein. The pivotal axis for the pivotal load support is also intimated here by the broken line 6.

By way of yet a further embodiment, mention might be made that the longitudinal load support 2 may be generally hollow in order to accommodate in itself storage spaces for the transverse load supports 5 which, in this embodiment, do not need any permanent pivotal fixture in the longitudinal load supports.

In a supplementation of the above-described load carrier, this may be provided with flip-up cargo shift guards which are pivotal about shafts approximately parallel with the longitudinal direction of the longitudinal load supports 2. The cargo shift guards are, in such instance, pivotal about pivot shafts which are preferably located parallel with the lower shank in the profile of the longitudinal load support. Hereby, the cargo shift guard will, in its raised position, enter into abutment against the upper shank in the longitudinal load support in order thereby to be locked in a projecting position approximately vertically above the longitudinal load support. Ideally, the cargo shift guard is placed in register with the feet 3 and 4 of the load carrier and possibly recessed in the insides thereof in the downwardly pivoted inoperative position. Securement of these pivotal cargo shift guards is suitably realised by means of anchorage bodies which are designed in a manner wholly in analogy with the joint members 11 and the locking portions 21.

The present invention should not be considered as restricted to that described above and shown on the Drawings, many modifications being conceivable without departing from the spirit and scope of the appended claims.

I claim:

1. A load carrier for vehicles, comprising:

two longitudinal load supports, each adapted to be selectively fastened lengthwise from front to rear on a vehicle roof, and each support having lengthwise extending recesses;

at least one transverse load support having a free end and a pivot end, the pivot end pivotally fastened in one of a selected number of positions along the length of a first of the longitudinal load supports, said transverse load support being pivotable about a vertical axis in a horizontal plane between a first position at least partially within the recess of said first longitudinal load support, and a second position extending transversely between said first longitudinal load support and a second of the longitudinal load supports, the free end of the transverse load support having means for securing the free end in a selected position in said second longitudinal load support;

at least one joint member selectively positionable along the length of the recess of said first longitudinal load support, said joint member having pivot means for pivotally fastening the pivot end of the transverse load support;

at least one locking member movable within the recess of the second longitudinal support and having locking means for cooperating with the securing means of the free end of the transverse load support for securing the free end; and fastening means for positionally fixing the joint member and the locking member at a selected position in the recesses of the respective longitudinal support member.

2. The load carrier of claim 1, wherein the longitudinal load support has a C-shaped cross section.

3. The load carrier of claim 1, wherein the longitudinal load support has an opening in a side wall of a shaped cross section.

4. The load carrier of claim 1, wherein the recess in the first longitudinal load support faces the recess in the second load support.

5. The load carrier of claim 1, wherein the pivot means of the joint member permits the transverse load support to pivot a predetermined amount in a vertical plane.

6. The load carrier of claim 1, wherein the locking member includes a cross pin and a recess, and the securing means of the free end includes locking lugs having a slot for engaging the cross pin to align the free end in the locking member and a spring pawl which engages the recess for locking the free end to the locking member.

7. The load carrier of claim 1, wherein the recesses in the longitudinal load supports are provided with longitudinally extending protruding ribs, and the fastening means includes complementary shaped profiles on the joint member and locking member that cooperate with the ribs for guiding longitudinal sliding movement of the joint member and locking member in the recess and for preventing the joint member and locking member from moving transversely out of the respective recesses.

8. The load carrier of claim 7, wherein the fastening means further comprises a locking washer provided with protruding edge portions for grasping edge portions of the recess and a screw passing through the locking washer and engaging the joint member for pulling the locking washer and one of the joint member together.

9. The load carrier of claim 7, wherein the fastening means further comprises a locking washer provided with protruding edge portions for grasping edge portions of the recess and a screw passing through the locking washer and engaging the locking member for pulling the locking washer and one of the locking member together.

10. A load carrier for vehicles, comprising:

two longitudinal load supports, each adapted to be fastened lengthwise of the vehicle on a vehicle roof, and having a closed cross section portion;

a first transverse load support having one end pivotally fastened to a first of said longitudinal load supports, said transverse load support being pivotable between a first position longitudinally along said first longitudinal load support, and a second position extending transversely between said first longitudinal load support and a second of said longitudinal load supports, a free end of the transverse load support having means for securing the transverse load support to said second longitudinal load support;

a second transverse load support having one end pivotally fastened to the second of said longitudinal load supports, said transverse load support being pivotable between a first position longitudinally along said second longitudinal load support, and a second position extending transversely between said second longitudinal load support and the first longitudinal load support, a free end of the second transverse load support having means for securing the second transverse load support to said first longitudinal load support;

mounting lugs movably received within a longitudinal recess in each longitudinal load support, the longitudinal recess having a receiving space for receiving a transverse load support, the mounting lugs extending transversely from each longitudinal load support toward the other of each longitudinal load supports, the transverse load supports being pivotally fastened to pivot means of the mounting lugs.

11. A load carrier for vehicles, comprising:

two longitudinal load supports, each adapted to be fastened lengthwise on a vehicle roof;

said longitudinal load supports having a generally complementary transverse cross section, a longitudinally extending recess being defined by the cross section, said supports having longitudinally extending reinforcing ribs protruding from opposed inner surfaces into the recess;

at least one joint member movably positioned in said recess of a first longitudinal load support, said joint member having a profile which engages the reinforcing ribs to prevent the joint member from transverse movement from the recess;

at least one locking member movably positioned in said recess of a second longitudinal load support, said locking member having a profile which engages the reinforcing ribs to prevent the locking member from transverse movement from the recess;

at least one transverse load support having one end pivotally fastened to the joint member, said transverse load support being pivotable between a first position at least partially within the recess of said first longitudinal load support, and a second position extending transversely between said first longitudinal load support and the second of the longitudinal load supports, a free end of the transverse load support having securing means for securing the free end to said locking member;

means for selectively securing the joint member and locking member in a number of locations in each respective recess.

12. A load carrier for vehicles, comprising:

two longitudinal load supports, each adapted to be selectively fastened lengthwise from front to rear on a vehicle roof, and each support having lengthwise extending recesses;

at least one transverse load support having a free end and a pivot end, the pivot end pivotally fastened in one of a selected number of positions along the length of a first of the longitudinal load supports, said transverse load support being pivotable about a vertical axis in a horizontal plane between a first position at least partially within the recess of said first longitudinal load support, and a second position extending transversely between said first longitudinal load support and a second of the longitudinal load supports, the free end of the transverse load support having means for securing the free end in a selected position in said second longitudinal load support;

at least one joint member selectively positionable along the length of the recess of said first longitudinal load support, said joint member having pivot means for pivotally fastening the pivot end of the transverse load support, the pivot means permitting linear displacement of the transverse load support relative to a pivot axis;

at least one locking member selectively positionable within the recess of the second longitudinal support and having locking means for cooperating with the securing means of the free end of the transverse load support for securing the free end; and fastening means for positionally fixing the joint member and the locking member at a selected position in the recesses of the respective longitudinal support member.

13. The load carrier of claim 12, wherein the locking member includes a cross pin and a recess, and the securing means of the free end includes locking lugs having a slot for engaging the cross pin to align the free end in the locking member and a spring pawl which engages the recess for locking the free end to the locking member.

14. A load carrier for vehicles, comprising:

two longitudinal load supports, each adapted to be selectively fastened lengthwise from front to rear on a vehicle roof, and each support having lengthwise extending recesses;

at least one transverse load support having a free end and a pivot end, the pivot end pivotally fastened in one of a selected number of positions along the length of a first of the longitudinal load supports, said transverse load support being pivotable about a vertical axis in a horizontal plane between a first position at least partially within the recess of said first longitudinal load support, and a second position extending transversely between said first longitudinal load support and a second of the longitudinal load supports, the free end of the transverse load support having means for securing the free end in a selected position in said second longitudinal load support;

at least one joint member selectively positionable along the length of the recess of said first longitudinal load support, said joint member having pivot means for pivotally fastening the pivot end of the transverse load support, the pivot means comprising a pivot pin mounted on an anchorage portion of the joint member, the transverse load support having at least one anchorage lug having an elongated slot for receiving the pivot pin, said elongated opening permitting displacement of the transverse load support relative to the pivot pin, and the transverse load support having means for biasing away from the joint member;

at least one locking member selectively positionable within the recess of the second longitudinal support and having locking means for cooperating with the securing means of the free end of the transverse load support for securing the free end; and fastening means for positionally fixing the joint member and the locking member at a selected position in the recesses of the respective longitudinal support member.

15. The load carrier of claim 14, wherein the anchorage lugs comprise two parallel spaced shanks having a receiving space between the shanks for receiving an anchor portion of a transverse load support.

16. The load carrier of claim 14, wherein the locking member includes a cross pin and a recess, and the securing means of the free end includes locking lugs having a slot for engaging the cross pin to align the free end in the locking member and a spring pawl which engages the recess for locking the free end to the locking member.

* * * * *